(12) United States Patent
Huber (10) Patent No.: US 9,446,880 B2
(45) Date of Patent: Sep. 20, 2016

(54) FLOOR ELEMENT FOR A CARGO CONTAINER AND/OR A CARGO PALLET, AND METHOD FOR PRODUCTION OF A CORRESPONDING FLOOR ELEMENT

(71) Applicant: Telair International GmbH, Miesbach (DE)

(72) Inventor: Thomas Huber, Schliersee (DE)

(73) Assignee: Telair International GmbH (DE)

(*) Notice: Subject to any disclaimer, the term of this patent is extended or adjusted under 35 U.S.C. 154(b) by 0 days.

(21) Appl. No.: 14/620,996

(22) Filed: Feb. 12, 2015

(65) Prior Publication Data

US 2015/0246749 A1  Sep. 3, 2015

(30) Foreign Application Priority Data

Mar. 12, 2014 (DE) .................. 10 2014 103 317

(51) Int. Cl.
| | |
|---|---|
| *G08B 13/14* | (2006.01) |
| *B65D 19/38* | (2006.01) |
| *B65D 88/14* | (2006.01) |
| *B65D 19/00* | (2006.01) |
| *G06K 19/077* | (2006.01) |

(52) U.S. Cl.
CPC .......... *B65D 19/38* (2013.01); *B65D 19/0002* (2013.01); *B65D 88/14* (2013.01); *G06K 19/07758* (2013.01); *B65D 2203/10* (2013.01); *B65D 2519/00034* (2013.01); *B65D 2519/00059* (2013.01); *B65D 2519/00069* (2013.01); *B65D 2519/00273* (2013.01); *B65D 2519/00288* (2013.01); *B65D 2519/00318* (2013.01); *B65D 2519/00323* (2013.01); *B65D 2519/00343* (2013.01); *Y10T 29/49826* (2015.01)

(58) Field of Classification Search
CPC .............. G08B 25/10; B65D 2203/10; B65D 19/0002; B65D 19/38
USPC ........................................ 340/572.8
See application file for complete search history.

(56) References Cited

U.S. PATENT DOCUMENTS

| 4,136,429 A * | 1/1979 | Brandes ............. B01L 9/06 29/235 |
| 7,948,384 B1 * | 5/2011 | Kennedy ............. G06Q 10/00 235/492 |

FOREIGN PATENT DOCUMENTS

| EP | 2384974 | 11/2011 |
| JP | 2007241781 A | 9/2007 |
| JP | 2013214211 A | 10/2013 |
| KR | 101207673 B1 | 12/2012 |

(Continued)

OTHER PUBLICATIONS

Patent Abstracts of Japan, Publication 2007241781, Published Sep. 20, 2007 for Structure for Removably Attaching IC Tag.

(Continued)

*Primary Examiner* — Don N Vo
(74) *Attorney, Agent, or Firm* — Barnes & Thornburg LLP (57) ABSTRACT

A floor element for cargo containers and/or cargo pallets. The floor element comprises at least one RFID transponder, at least one bore with an opening on the floor underside, and a transponder holder device preferably made of plastic for holding the RFID transponder, wherein the transponder holder device is fixed in the bore. The floor element provides better communication between RFID transponders and corresponding readers.

12 Claims, 4 Drawing Sheets

(56) References Cited

FOREIGN PATENT DOCUMENTS

| WO | 2006080857 | 3/2006 |
| WO | 2012012367 | 1/2012 |

OTHER PUBLICATIONS

European Search Report in Application 15155528.1, dated Jun. 26, 2015.

* cited by examiner

FLOOR ELEMENT FOR A CARGO CONTAINER AND/OR A CARGO PALLET, AND METHOD FOR PRODUCTION OF A CORRESPONDING FLOOR ELEMENT

The invention concerns a floor element for a cargo container and/or a cargo pallet and a corresponding method.

Goods shipped by freight in high numbers are increasingly transported in containers, on pallets or similar ULDs (unit load devices) in aircraft. The main concern here is that the loading and unloading procedure should proceed as quickly and safely as possible. The freight must be stowed correctly in the aircraft's hold so that no damage occurs even during a turbulent flight. Thus problems arise firstly in the area of logistics, in the planning and implementation of the transport routes and times, and secondly in the area of the loading and unloading procedures themselves.

It is known (EP 2 384 974 B1) to equip cargo containers with RFID transponders or RFID tags, so that these can be identified on loading and unloading. Furthermore, in some cases the RFID transponders on cargo containers are used to give position data of the cargo container on cargo decks equipped with corresponding RFID readers or RFID read devices.

In practice, secure reading of corresponding RFID transponders on cargo containers and/or cargo pallets is extremely problematical. Thus an aircraft hold contains numerous cargo containers and/or pallets which may be all equipped with corresponding RFID transponders. In particular when using active RFID transponders, it is therefore difficult to separate the signals from each other. Furthermore, the environment in which the cargo containers and/or cargo pallets equipped with corresponding RFID transponders are used is extremely aggressive, so these must be protected from rain, impacts, temperature fluctuations etc. One particular problem however has been that both the cargo containers and/or the cargo pallets themselves contain numerous components made of metal and metal alloys. Furthermore the cargo deck comprises numerous metallic objects. The RFID transponders and RFID readers used are therefore in direct contact with metallic materials, which renders communication more difficult.

Starting from this prior art (EP 2 384 974 B1), the object of the present invention is to provide a floor element for a cargo container and/or a cargo pallet which accommodates an RFID transponder so that a corresponding signal can be detected securely and efficiently.

Furthermore, the floor element must be able to be used reliably for a long period under the difficult conditions described.

This object is achieved by a floor element for a cargo container and/or a cargo pallet, wherein the floor element comprises:
at least one RFID transponder,
at least one bore with an opening on the floor underside,
a transponder holder device preferably made of plastic for holding the RFID transponder, wherein the transponder holder device is fixed in the bore.

One essential aspect of the present invention is that the RFID transponder or transponders are arranged in the floor element, i.e. relatively close to the cargo deck. According to the invention, the RFID transponder is encapsulated in a transponder holder device which protects this from harmful influences. The transponder holder device is anchored in a bore on the floor element so that external impacts do not act directly on the transporter holder device, but first act on the frame structure of the floor element. The bore with the anchored transponder holder device is preferably open towards the bottom so that the RFID transponder can be read from below, for example by a reader installed (horizontally) in the cargo deck.

In one embodiment, the transponder holder device is made at least partly of plastic, so that when reading the RFID transponder from below, there are almost no metallic materials between the reader and the RFID transponder. Secure communication between the RFID transponder and the associated reader is thereby ensured. Furthermore, this embodiment of the floor element means that no active RFID transponders are required. Passive RFID transponders are distinguished in particular in that they require no maintenance over a very long service life. The use of passive RFID transponders furthermore has the advantage that these only have a very short range. Reception of the necessary data is not therefore disrupted by further RFID transponders, for example on other cargo containers and/or cargo pallets and/or loads. The fixing of the transponder holder device in the bore furthermore allows replacement of the RFID transponder or the transponder holder device together with the RFID transponder in the event of failure. According to the invention therefore, the identification of a specific cargo container and/or a specific cargo pallet may be changed without substantial expense.

The transponder holder device may comprise a holder device base plate of plastic for holding the RFID transponder. At least the base plate of the transponder holder device is configured as a plastic component so as not to interfere with communication with the reader.

The holder device base plate may have a polygonal basic form and/or catches for form-fit holding of the holder device base plate or the transponder holder device in the bore. Because of the polygonal basic form and/or the catches, a predefined orientation of the holder device base plate can be guaranteed. This leads to a predefined orientation of the RFID transponder which is preferably fixed to the holder device base plate. To this extent, an RFID transponder orientation may be selected which allows a particularly good detection of the respective RFID transponder. Furthermore, an orientation may be selected which facilitates position determination of the cargo container and/or cargo pallet using the RFID transponder.

The polygonal basic form and/or configuration of the catches may be selected so that a holder device base plate can be fixed in a plurality of positions. For example, by configuring the holder device base plate in octagonal form, this may be fixed in eight different orientations within a plane parallel to the floor underside. To assume the individual positions, the holder device base plate may be twisted through approximately 45°. It is therefore possible to fix the RFID transponder in a position at 0°, 45°, 90°, 135°, 180°, 225°, 270° and 315°. According to the invention, other basic forms—not octagonal—may be selected, for example rectangular, hexagonal but also oval.

In one exemplary embodiment, the RFID transponder is inserted in the transponder holder device such that it assumes an orientation which is optimised for reading by means of a read antenna running substantially parallel to the floor underside of the floor element. Depending on the RFID transponder selected, this may mean that the antenna of the RFID transponder lies in a plane which runs parallel to the floor underside of the floor element. Thus the floor element may be optimised for reading from below. The read antennae may be provided over a relatively large area of the cargo deck, in particular in the entrance region of the aircraft's hold.

The at least one bore may comprise a thread in which the transport holder device is screwed, preferably from above. In the fixing of the transponder holder device, because of the possibility of maintenance and replacement, a reversible connection is preferred between the bore and the transponder holder device. A thread can easily be produced on the transponder holder device and inside the bore, and fulfils this requirement. Because of the at least two-piece configuration of the transponder holder device, preferably with polygonal basic form, a predefined orientation of the RFID transponder may be guaranteed despite the use of a thread. The bore is preferably arranged and configured so that the transponder holder device can be screwed into the bore from above, i.e. from the top of the floor. Maintenance work may therefore be carried out on site, possibly even inside the aircraft.

In one embodiment, a floor element comprises a plurality of bores, each containing a transponder holder device with at least one RFID transponder. There may be at least 2, in particular at least 3, in particular at least 4 bores. In a preferred embodiment, the bores are provided at the corners of the floor element. Provision of the bores at the corners has the consequence that the transponders of a floor element are spaced as far apart as possible, so that no interference can occur. Furthermore, fitting the RFID transponders at the corners allows detection of significant points of the respective floor element. To this extent, electronic determination of the position and/or orientation of the floor element is possible.

According to the application, the floor underside spans a floor underside plane or "conveyor plane". In one exemplary embodiment of the invention, the RFID transponder and/or the transponder holder device and/or the holder device base plate is/are significantly spaced from this floor underside plane. This spacing may be at least 1 mm, in particular at least 3 mm, in particular at least 5 mm, and has the advantage that the transporter holder device, in particular its base plate, is not exposed to any impact during transport of the floor element on a cargo deck. This is particularly advantageous since the corresponding elements may be designed less solid for better transmission. The abovementioned plastic design is possible without fear of wear.

In one exemplary embodiment, the corresponding spacing is ensured in that a shoulder is provided in or on the bore.

The shoulder may be configured so that the RFID transponder is spaced from the floor underside plane by less than 30 mm, in particular by less than 25 mm, in particular by less than 20 mm, in particular by less than 15 mm, in particular by less than 10 mm. This small distance ensures that reading of the RFID transponder from below can be safely guaranteed.

The at least one bore may be spaced from an outer edge of the floor element by at least 1 cm. According to the invention, the corresponding spacing may also be selected significantly larger, for example with a spacing of at least 2 cm and/or at least 3 cm. This spacing from the outer edge ensures that the bore and the transponder holder device arranged therein are adequately protected from impacts. Furthermore, this arrangement guarantees that the RFID transponder is screened in the lateral direction. To this extent, the areas from which the corresponding RFID transponder can be read are concentrated above and below the bore. Lateral reading is not possible, so interference is avoided. Furthermore, the position of the RFID transponder may also be determined very precisely using a single receiver antenna, whereby greater precision can be achieved in the overall position determination of the cargo container and/or cargo pallet.

The transponder holder device may, as already explained, be configured as a hollow body. A design in at least two pieces has advantages. The transponder holder device may also be configured in the manner of a closable housing in which the RFID transponder can be inserted. Preferably a fixing device is provided for insertion of the RFID transponder. The fixing device may be a simple recess in the holder device base plate, in which the RFID transponder is inserted with a varying degree of form fit. The at least two-piece design of the hollow body has the further advantage that the holder device base plate may be positioned and oriented separately from the rest of the transponder holder device. To this extent, predefined positions may be assumed.

The floor element may comprise at least one floor plate and at least one frame, wherein the at least one bore is provided in a corner profile of the frame. Preferably, this frame is made from a metal alloy. The transponder holder device according to the invention may be used particularly advantageously in conjunction with a correspondingly configured frame. The floor plate may be made at least partially from fibre-reinforced plastic.

The frame may comprise at least four hollow profiles and at least four corners, wherein the hollow profiles and corner profiles can be connected to each other preferably via plug-in connections.

Preferably the RFID transponder communicates on longwave frequencies (LF) and/or on short-wave frequencies (HF/RF). The RFID transponders are thus configured to transmit and/or receive in the range from 30 kHz to 30 MHz. Preferred frequencies lie in the range from 3-30 MHz.

In addition, said object is achieved by a container and/or a cargo pallet having a floor element such as has already been described.

A further solution according to the invention consists of a system comprising said cargo containers and/or floor pallets, and a cargo deck equipped with an RFID reader installed in the cargo floor. In an advantageous embodiment of the system, the read antenna is oriented substantially parallel to the floor underside plane. The read antennae may be located in function units, for example roller drive units and/or ball mats of the cargo deck. Preferably the at least one read antenna is provided close to or in the entrance area of the hold.

Said object is furthermore achieved by a method for production of a floor element for cargo containers and/or cargo pallets. These are preferably floor elements as already described above. The method comprises the following steps:
  a) fixing of an RFID transponder to a transponder holder device and/or to a holder device base plate of the transponder holder device;
  b) insertion of the holder device base plate in a bore of the floor element and/or arrangement of the transponder holder device in the bore;
  c) fixing of the transponder holder device by means of a thread.

Similar advantages arise to those already described in connection with the floor element. In particular, according to the invention, the holder device base plate may be positioned and oriented, wherein this is fixed by a later screw-fixing of the transponder holder device or remaining components.

The invention is described in more detail below with reference to several exemplary embodiments shown in the drawings. The drawings show.

In the description which follows, the same reference numerals are used for parts which are the same and parts which have the same effect.

Figure 1:
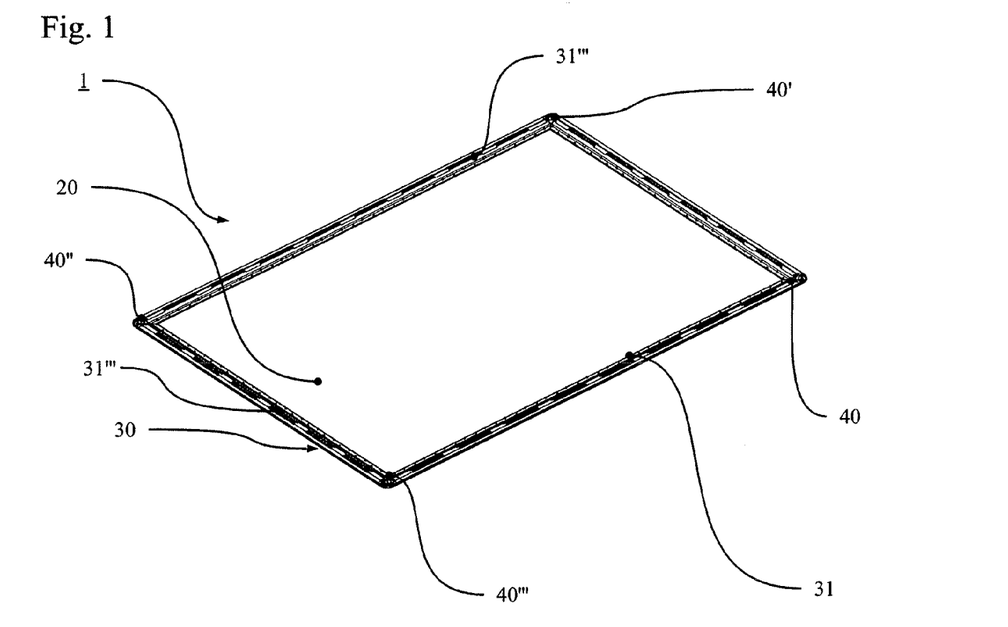
FIG. 1 a cargo pallet with a floor plate and a frame.

FIG. 1 shows a cargo pallet or pallet 1 according to the invention. This consists substantially of a floor plate 20 and a frame 30. The frame 30 consists of four corner profiles 40, 40', 40'', 40''' connected to hollow profiles 31, 31', 31'', 31'''. The hollow profiles 31, 31', 31'', 31''' and the corner profiles 40, 40', 40'', 40''' are push-joined together correspondingly and secured by screw connections.

Figure 2:
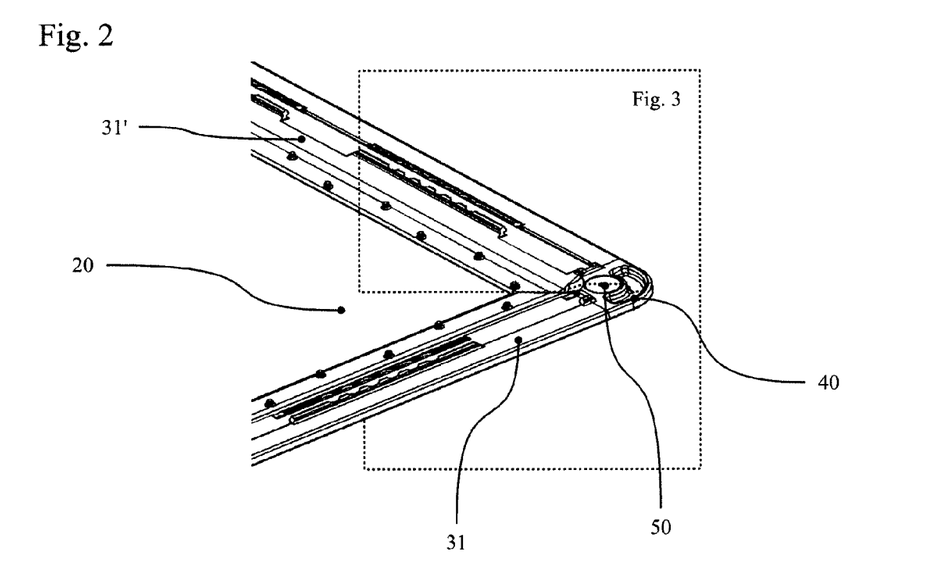
FIG. 2 a detailed view of the corner profile of the frame from FIG. 1.
Figure 3:
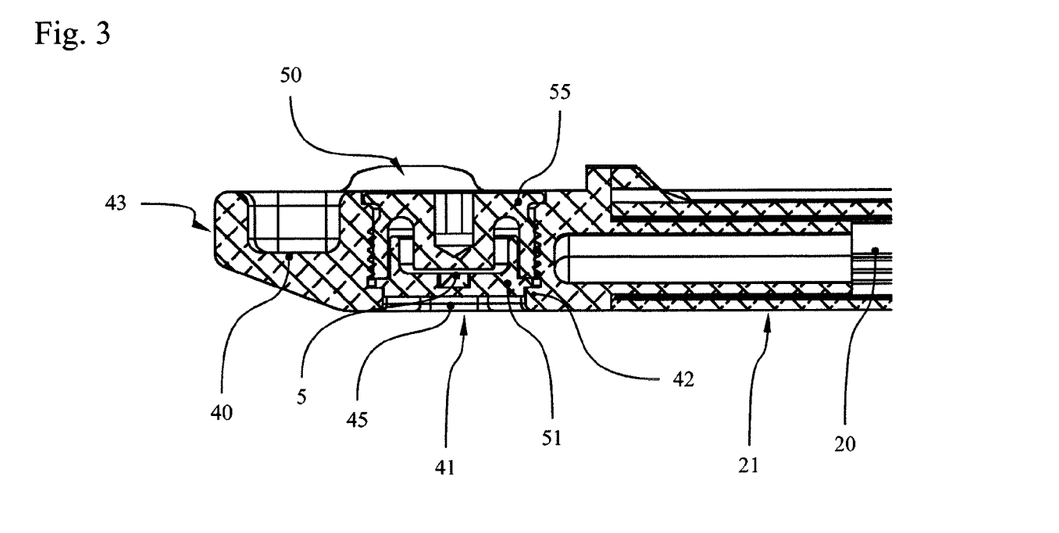
FIG. 3 a section through the corner profile from FIG. 2 with the transponder holder device according to the invention.

Each corner profile 40, 40', 40'', 40''' of the pallet 1 is equipped with an RFID transponder 5 (see FIG. 3). For this, a transponder holder device 50, 50', 50'' is provided at each corner profile 40, 40', 40'', 40'''. FIG. 2 shows a view of the first corner profile 40 equipped with the transponder holder device 50. The transponder holder device 50 is a cylindrical body screwed into the corner profile 40.

FIG. 3 shows a section through the first corner profile 40. The cut plane runs substantially perpendicular to the floor plate 20 and at a 45° angle through the corner profile 40. The section in FIG. 3 shows the transponder holder device 50 screwed into a bore 41. The bore 41 runs substantially perpendicular to the floor underside 21 of the floor plate 20. The diameter of the bore 41 is smaller in the bottom portion, forming the shoulders 42 on either side with an opening 45 open towards the bottom.

Figure 4:
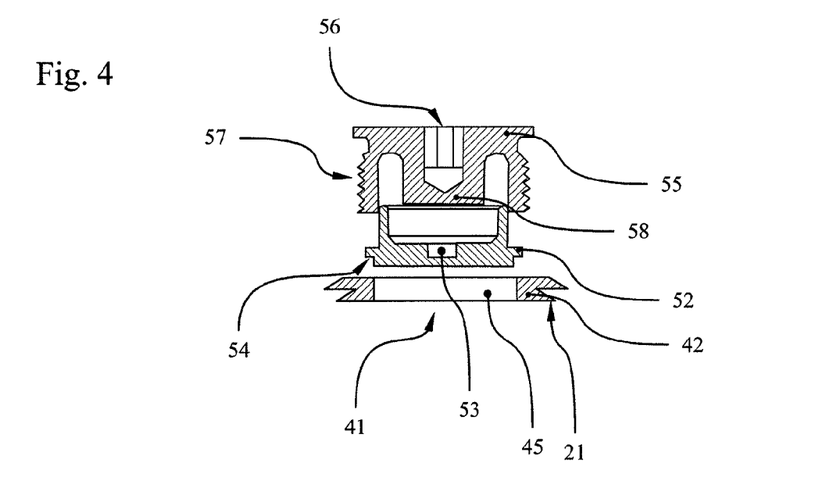
FIG. 4 a schematic section through the holder device from FIG. 3.

The transponder holder device 50 is formed in two pieces. As illustrated in FIG. 4, these are two hollow cylinders each closed at a cover face, wherein the hollow cylinders are configured such that they can be inserted one inside the other to form a closed hollow body, namely the transponder holder device 50. The upper hollow cylinder is referred to below as the threaded cylinder 55, and the lower one as the holder device base plate 51. The holder device base plate 51 is substantially U-shaped in cross-section, wherein the legs of the U protrude into the threaded cylinder 55. Side protrusions form a ring 52 which in inserted state lies on the shoulder 42 of the corner profile 40. More precisely, the downwardly directed stop surface 54 of the ring 52 rests on the shoulder 42. To this extent, the holder device base plate 51 assumes a predefined position in the bore 41. On the inside, the holder device base plate 51 has in its centre a rectangular recess to receive the RFID transponder 5. This is a transponder receptacle 53 which may be adapted to the RFID transponder dimensions in order to achieve a form fit. In inserted state of the transponder holder device 50, a web 58 closes the transponder receptacle 53 so that the RFID transponder 5 is held securely therein.

According to the invention, before insertion of the threaded cylinder 55 in the bore 41, the holder device base plate 51 may be positioned on the shoulder 42. Then the threaded cylinder 55 may be screwed into the bore 41. In screwed in-state, the threaded cylinder 55 simultaneously fixes the RFID transponder 5 to the transponder receptacle 53 and fixes the holder device base plate 51 to the shoulder 42. Thread 57 is provided for screwing the threaded cylinder 55 in place.

To facilitate the screwing of the threaded cylinder 55, this has a tool receptacle 56 on the side facing away from the holder device base plate 51. In the exemplary embodiment shown, the tool receptacle 56 is formed as a hexagonal socket for receiving a corresponding Allen key.

In one embodiment, the opening 45 is formed as an octagonal socket, wherein the portion of the holder device base plate 51 protruding into the opening 45 is configured correspondingly octagonally. To this extent, within the horizontal plane there are eight predefined positions which the holder device floor plate 51 may assume. These predefined positions may be used to orient the RFID transponder 5 suitably in the horizontal plane, for example perpendicular to the image plane of FIG. 3.

Figure 5:
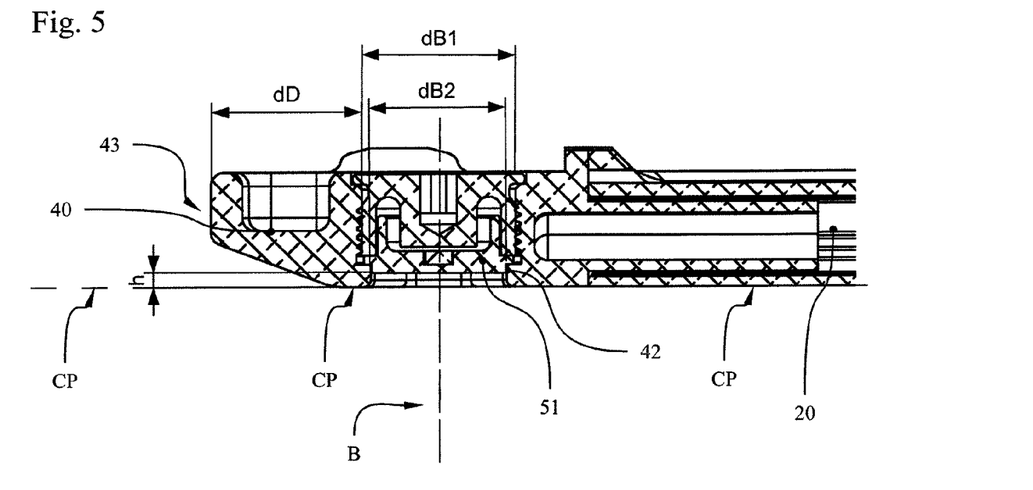
FIG. 5 the section from FIG. 3 with various distance and diameter data.

FIG. 5 shows the same section as FIG. 3, wherein additional reference symbols are provided to clarify the dimensions and positioning of the transponder holder device 50. Thus the bore 41—as already explained—extends perpendicular to the cargo floor plane or transponder plane CP along the bore axis B. The bore 41 has a larger inner diameter (thread bore diameter $dB1$=approximately 3.5 cm) in the upper region than in the lower region, namely in the region of the opening 45 (opening diameter $dB2$=approximately 3 cm), so as to form the shoulder 42.

The shoulder 42 and the holder device base plate 41, configured correspondingly thereto, ensure that the holder device base plate 41 is set back from the cargo floor plane CP. The resulting arrangement height h is 3 mm.

The bore 41 has a bore spacing $dD$ of around 3 cm from the outer edge 43.

Figure 6:
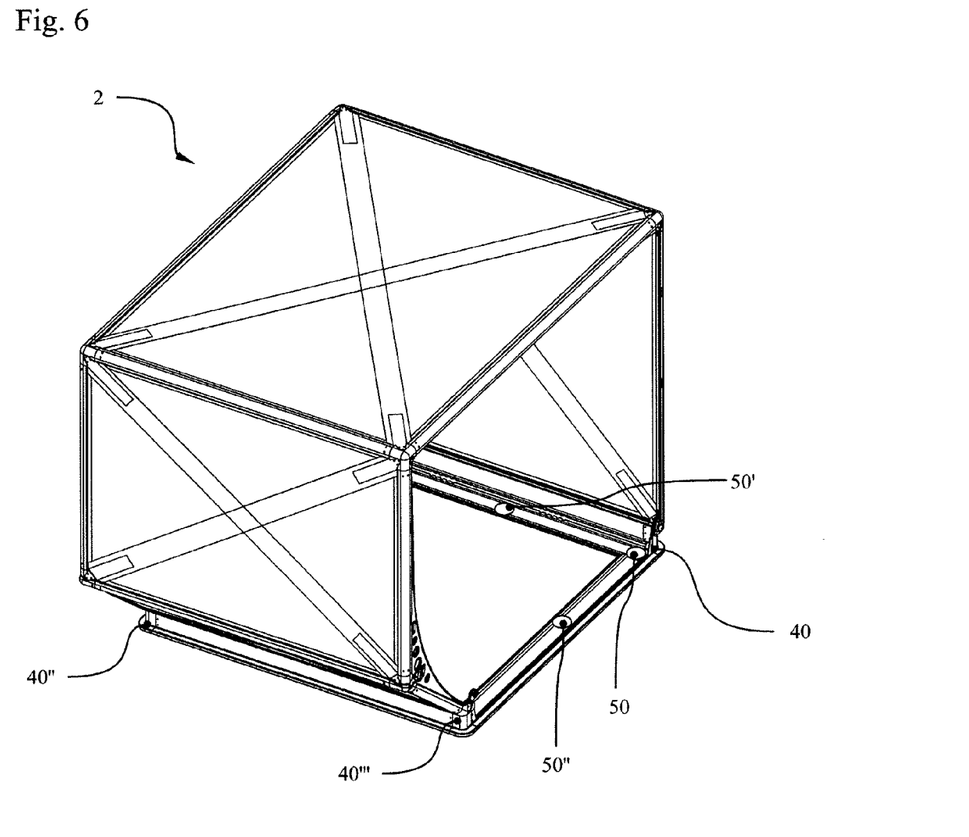
FIG. 6 a cargo container equipped with the transponder holder device according to the invention.

FIG. 6 shows an embodiment in which the floor element 10 according to the invention is used in conjunction with a container 2. Here again, a transponder holder device 50 with a corresponding RFID transponder 5 is provided on the corner profile 40. Further transponder holder devices 50 may be provided at the remaining three corners. In addition, the freight container 2 is equipped with further transponder holder devices 50', 50'' which are provided centrally between the corner profiles 40, 40', 40'', 40'''.

According to the invention, numerous further embodiments of the floor element 10 are conceivable. For example, the transponder holder devices 50, 50', 50'' may be arranged along a diagonal leading through the floor element 10. It is possible to equip the pallet 1 and/or the container 2 with 2, 4, 6 or 8 transponder holder devices 50, 50', 50'' according to the invention, or an odd number thereof. Similarly, a transponder holder device 50, 50', 50'' may be equipped with one or more RFID transponders 5 which for example work on clearly differing frequencies.

Figure 7:
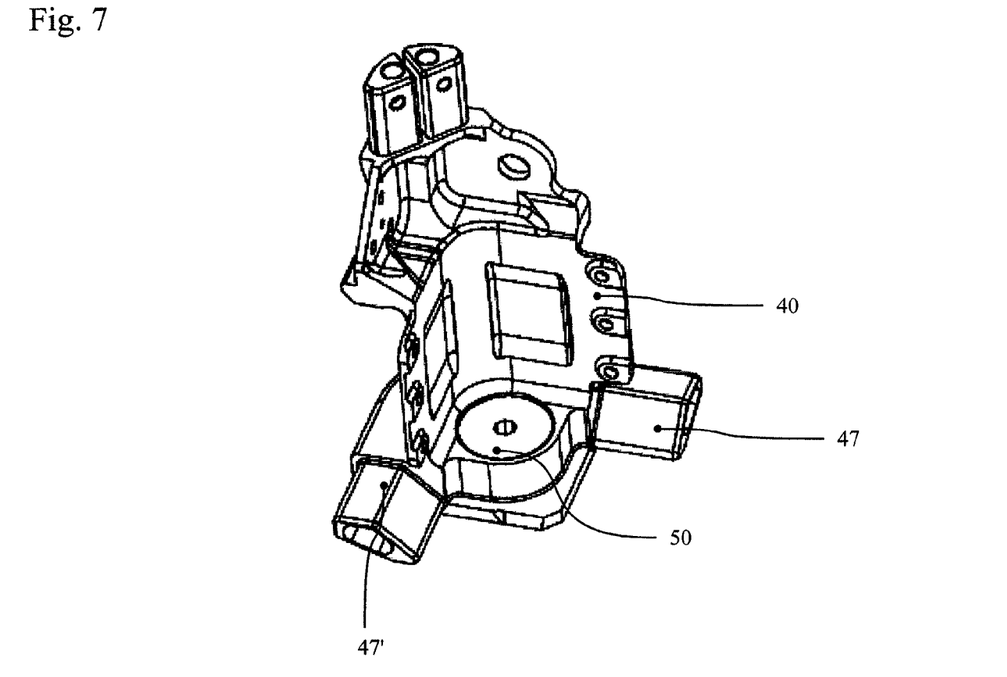
FIG. 7 a corner profile of the freight container according to FIG. 6.

In a preferred embodiment of the container 2, only the corner profiles 40 are equipped with corresponding transponder holder devices 50. FIG. 7 shows as an example a corner profile 40 equipped with a transponder holder device 50. The corner profile 40 has connecting pegs 47, 47' which may be connected to corresponding hollow profiles 31, 31', 31'', 31'''. The transponder holder device 50, like the transponder holder device 50 of pallet 1, may be screwed into the corner profile 40 from above.

Figure 8:
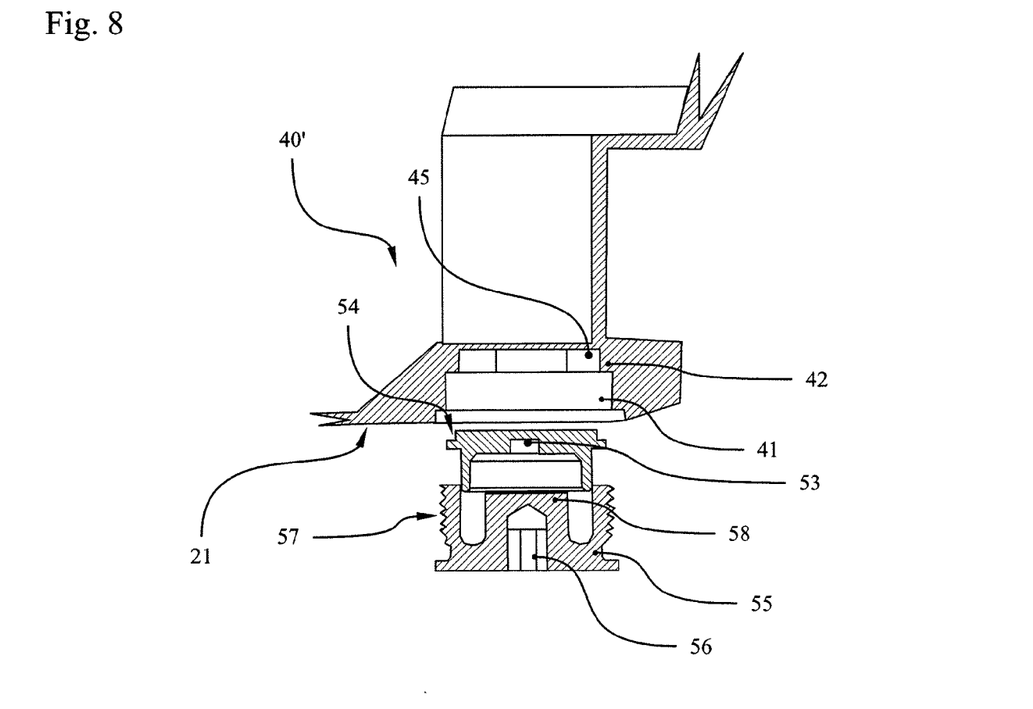
FIG. 8 a section through an alternative embodiment of the corner profile according to FIG. 7.

In a further embodiment according to the invention, the transponder holder device 50 is screwed into a corner profile, for example a corner profile 40 of the container 2, from below. A corresponding embodiment is depicted diagrammatically in FIG. 8. Here the opening 45 is formed hexagonally and receives the holder device base plate 41 from below. As in the embodiment in FIG. 4, a shoulder 42 is provided for the stop surface 54 of the holder device base plate 51. The threaded cylinder 55 may also be screwed into the bore 41 by means of the thread 57, so that both the RFID transponder 5 and the holder device base plate 51 are fixed.

In the exemplary embodiments described, the transponder holder devices 50, 50', 50" are two-piece hollow bodies. According to the invention, this arrangement may be supplemented by further components, for example seals. Similarly, the transponder holder devices 50, 50', 50" may be formed integrally. It is also possible to configure the transponder holder devices 50, 50', 50" as solid bodies which preferably surround the RFID transponder 5.

The transponder holder device 50, 50', 50" may be made as a thermoplastic, a duroplastic or as an elastomer. When produced as an elastomer, where applicable the thread 57 may be omitted since a form-fit connection can be created by means of deformation.

In the present application, the term "bore" is used. This does not however mean that the corresponding recess must necessarily be produced by an abrasive process. The bore 41 according to the invention and the opening 45 may also be produced in a casting process or another process.

LIST OF REFERENCE SYMBOLS

1 Pallet
2 Container
5 RFID transponder
10 Floor element
20 Floor plate
21 Floor underside
30 Frame
31, 31', 31", 31''' Hollow profile
40, 40', 40", 40''' Corner profile
41 Bore
42 Shoulder
43 Outer edge
45 Opening
47, 47' Connecting peg
50, 50', 50" Transponder holder device
51 Holder device base plate
52 Ring
53 Transponder receptacle
54 Stop surface
55 Threaded cylinder
56 Tool receptacle
57 Thread
58 Web
B Bore axis
CP Cargo floor plane or conveyor plane
dB1 Threaded bore diameter
dB2 Opening diameter
dD Bore spacing
h Arrangement height

What is claimed is:

1. A floor element for a cargo container and/or a cargo pallet with a floor underside, comprising:
   at least one RFID transponder,
   at least one bore with an opening on the floor underside, the at least one bore comprising an inner thread and a shoulder extending within the bore,
   a transponder holder device comprising a cylinder with an outer thread and a base plate made of plastic for holding the RFID transponder,
   wherein the transponder holder device is located within the bore with the outer thread of the cylinder of the transponder holder device coupled to the inner thread of the bore such that the base plate of the transponder holder device lies on the shoulder and such that the RFID transponder is spaced by less than 30 millimeters from a floor underside plane spanned by the floor underside.

2. The floor element according to claim 1, characterised in that the holder device base plate comprises a polygonal basic form and/or catches for form-fit holding in the bore.

3. The floor element according to claim 1, characterised in that the RFID transponder is configured for communication with a read antenna arranged parallel to the floor underside.

4. The floor element according to claim 1, characterised by at least two bores which are provided at the corners of the floor element.

5. The floor element according to claim 1, wherein the holder device base plate is spaced from the floor underside plane by at least 1 millimeter.

6. The floor element according to claim 1, characterised in that the at least one bore is spaced from an outer edge of the floor element by at least 1 centimeter.

7. The floor element according to claim 1, characterised in that the transponder holder device and/or the at least one bore has a diameter of at least 1 centimeter.

8. The floor element according to claim 1, characterised in that the transponder holder device is configured as a preferably two-piece hollow body with a fixing device for fixing the RFID transponder.

9. The floor element according to claim 1, characterised by at least one floor plate;
   a frame, wherein the at least one bore is provided in a corner profile of the frame.

10. The floor element according to claim 1, characterised in that the frame comprises at least four hollow profiles and at least four corner profiles, each having a bore for receiving a transponder holder device.

11. A method for production of a floor element for a cargo container and/or a cargo pallet with a floor underside, comprising the steps:
   providing a transponder holder device comprising a base plate and a cylinder with an outer thread;
   fixing of an RFID transponder to the base plate of the transponder holder device;
   orientating the RFID transponder and the base plate of the transponder holder device to a desired orientation with respect to the floor element;
   inserting the base plate of the transponder holder device in a bore of the floor element, the bore having an internal thread;
   screwing the cylinder of the transponder holder device into the bore with the outer thread of the cylinder in threaded engagement with the internal thread of the bore to thereby fix the base plate to the shoulder of the bore such that the RFID transponder is spaced by less than 30 millimeters from a floor underside plane spanned by the floor underside of the floor element.

12. The method according to claim 11, wherein the orientating of the base plate of the transponder holder device includes orientating the base plate to a desired orientation with respect to a polygonal socket formed by the bore, and wherein the inserting of the base plate in the bore of the floor element includes inserting the base plate in the polygonal socket of the bore.

* * * * *

UNITED STATES PATENT AND TRADEMARK OFFICE
CERTIFICATE OF CORRECTION

PATENT NO. : 9,446,880 B2  
APPLICATION NO. : 14/620996  
DATED : September 20, 2016  
INVENTOR(S) : Thomas Huber

Page 1 of 1

It is certified that error appears in the above-identified patent and that said Letters Patent is hereby corrected as shown below:

On the patent title page, Column 1, under item code (30), Foreign Application Priority Data should read as follows:

Mar. 12, 2014   (DE) 10 2014 103 317.5  
Feb. 28, 2014   (DE) 10 2014 102 670.5

Signed and Sealed this  
Twenty-second Day of November, 2016

Michelle K. Lee  
*Director of the United States Patent and Trademark Office*